July 15, 1969     H. WAERMÖ     3,455,525

VIBRATION REDUCING SUPPORT ELEMENT

Filed April 4, 1967     2 Sheets-Sheet 1

INVENTOR:
HARRY WAERMÖ
BY *Howson & Howson*
ATTYS.

July 15, 1969 H. WAERMÖ 3,455,525
VIBRATION REDUCING SUPPORT ELEMENT
Filed April 4, 1967 2 Sheets-Sheet 2
FIG. 5.
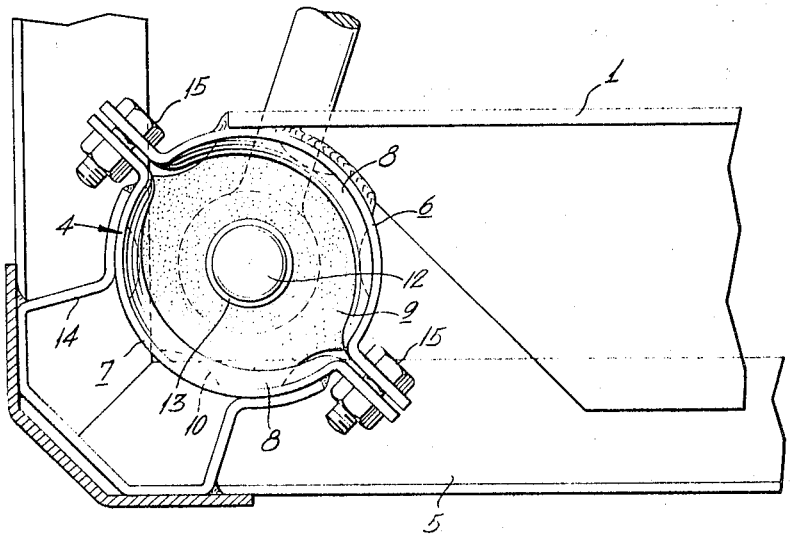
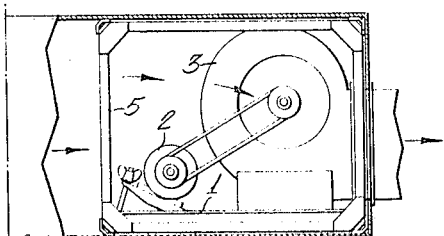
FIG. 6A
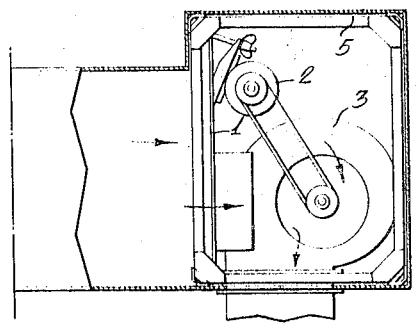
FIG. 6B
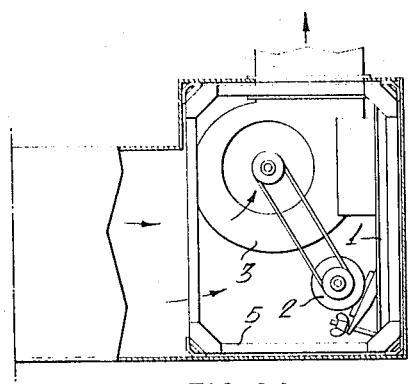
FIG. 6C
INVENTOR:
HARRY WAERMÖ
BY Howson & Howson
ATTYS.

United States Patent Office 3,455,525
Patented July 15, 1969

1

3,455,525
VIBRATION REDUCING SUPPORT ELEMENT
Harry Waermö, Jonkoping, Sweden, assignor to Aktiebolaget Svenska Flaktfabriken, Stockholm, Sweden
Filed Apr. 4, 1967, Ser. No. 628,418
Claims priority, application Sweden, Apr. 20, 1966, 5,335/66
Int. Cl. F16m 1/00; F16f 15/04
U.S. Cl. 248—15                                    2 Claims

ABSTRACT OF THE DISCLOSURE

A mount for the electric motor and fan in an air treatment system apparatus which includes a pair of semi-cylindrical shells having inwardly projecting grooves spaced axially therealong and a plurality of separate disk-like circular elements embraced by said shells and mounted in axially spaced positions by the grooves. The circular elements have aligned bores through which a shaft is engaged for support accompanied by vibration-dampening. The circular elements are resilient and are provided on their outer periphery with teeth or corrugations so as to be sensitive to vibrations of small amplitude, with increased resistance to vibrations of large amplitude.

---

The present invention relates to a vibration reducing support element to be used in a framework for instance for a stand mounted in said framework on which stand are arranged an electric motor and a fan driven by said motor. In many air treatment devices the motor and the fan are combined in a unit which usually is arranged in an apparatus housing where the skeleton proper consists of a framework on which side walls, ceiling and bottom are mounted. In such cases the fan and the motor are placed on a stand which easily can be pulled out from the apparatus housing for an inspection or repair. The fan and the motor are rigidly fixed to the stand which always has the same position in the apparatus housing. The stand is mounted on vibration reducing cushions of rubber, which however only can absorb compressive forces. Due to this, the stand must be adjusted in the horizontal plane to prevent pulling or transverse forces in the rubber cushions, causing them to be deformed or even destroyed. The outlet of the fan opens into a certain side wall of the apparatus housing and the air blow direction will thus be fixed to a certain, preferably horizontal plane. In order to have the possibility to change as required the direction of the blow direction of the fan for the purpose of connecting same to ventilating ducts hitherto known, apparatus housings had to be made with separate connecting ducts to be joined with the aparatus housing which makes the design both expensive and complicated.

It is an object of the present invention to create an element which may be used both as a vibration-reducing and as a supporting element, for instance for a stand mounted in a framework on which stand are mounted an electric motor and a fan driven by said motor. By making said element as a support element, the air supply aperture of the apparatus housing can be given an orientation suitable for each connection alternative without regard to the forces on the element.

Another object of the invention is to create a successive increase of the deformation resistance at increasing stresses.

Thanks to the fact that the stand is joined to the framework by supporting elements according to the invention, the apparatus housing can now be given any orientation suitable for the connection to existing ventilating ducts.

Figure 2:
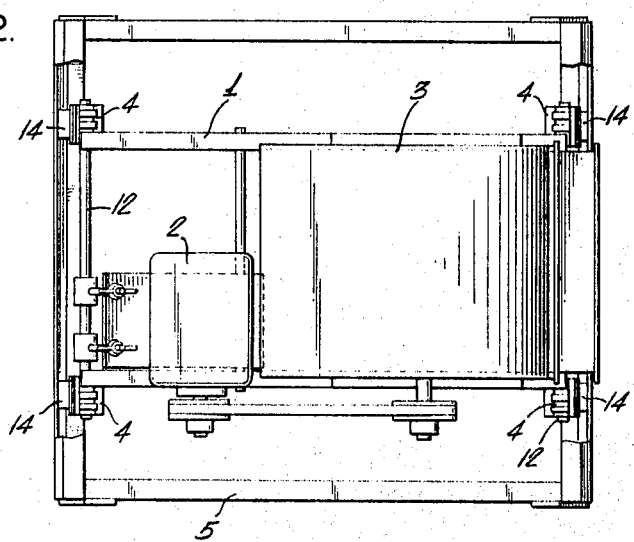
Figure 1:
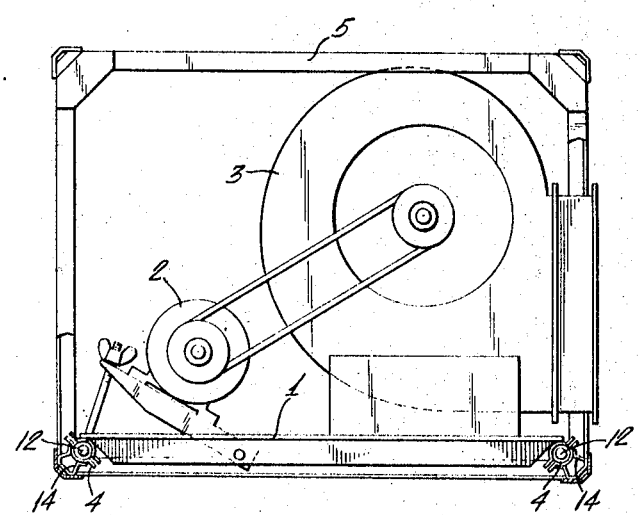
Figure 3:
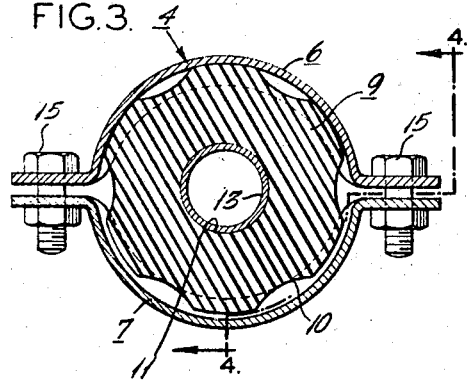
Figure 4:
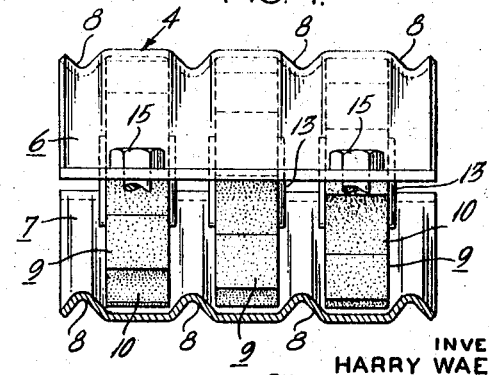

An embodiment of the invention will now be more fully described with reference to the accompanying drawing figures, wherein FIG. 1 illustrates a side view of an apparatus housing without side walls and ceiling, FIG. 2 shows the same apparatus housing seen from above, FIG. 3 shows a section of an element according to the invention, FIG. 4 illustrates a section view along the line A—A of FIG. 3, FIG. 5 shows a detail of an element according to FIG. 1 and FIGS. 6A, 6B and 6C illustrate some examples of different arrangements of an apparatus housing.

In the present case an electric motor 2 and a fan 3 are mounted on a stand 1. The motor and the fan are fixed to the stand and the air outlet of the fan will thus always have the same position in the apparatus housing. The stand 1 is by means of vibration reducing elements mounted in a framework 5, which forms the skeleton of an apparatus housing. The elements 4 consist of two semi-cylidrical sheet-metal shells 6 and 7 equipped with inwardly depressed grooves 8. The shells embrace a number of disk-shaped and circular members 9 of rubber or other elastic material. The disk-shaped members 9 have a toothed or corrugated peripheral surface 10, due to which the deformation resistance will increase at increasing stresses. Because of the configuration of the peripheral surface which engages the shells, the device is sensitive to vibrations of small amplitude and has increased resistance to vibrations of large amplitude. In the centre of said disk-shaped members there is a hole 11 for a shaft 12 (FIGS. 1 and 2) which shaft passes through the disk-shaped members and is fastened to the framework 5. In order to make possible a more exact fitting of said shaft the bore of each of said members 9 may be provided with a bushing 13 made of metal. From FIG. 5 is evident that one of the semi-cylindrical shells 7 is fastened to the frame 5 by means of brackets 14.

The shells 6, 7 may suitably be joined to each other by means of bolts 15 passing through the shells. Thanks to this construction of the support elements the vibrations which emanate from the motor and fan are reduced at the same time as said elements support the whole stand independently of the orientation of the apparatus housing. FIGS. 6A, 6B and 6C show some examples of how the apparatus housing may be arranged to make possible some alternatives of duct connections to the air outlet of the fan.

I claim:

1. A vibration dampening support for mounting a structure having a shaft comprising a pair of detachably joined, semi-cylindrical shells embracing circular dampening means made of rubber or other elastic material and provided with a concentric bore for said shaft, said dampening means consisting of a plurality of separate co-axial disk-like circular elements, each formed with a toothed or corrugated outer peripheral surface engaging said shells, and inwardly depressed grooves provided in said shells intermediate said elements to mount said circular elements in axially-spaced position between said semi-cylindrical shells.

2. A vibration dampening support according to claim 1 wherein said grooves project inwardly beyond the teeth or corrugations in the outer peripheral surface of said elements.

References Cited

UNITED STATES PATENTS

| 2,631,776 | 3/1953 | Palmer | 248—26 X |
| 2,948,502 | 8/1960 | Hutton | 248—358 |
| 3,140,901 | 7/1964 | Young | 248—26 |

FOREIGN PATENTS

| 930,359 | 1/1948 | France. |
| 586,888 | 4/1947 | Great Britain. |

ROY D. FRAZIER, Primary Examiner

J. F. FOSS, Assistant Examiner

U.S. Cl. X.R.

248—22, 358